US00RE41647E

(19) United States
(12) Reissued Patent
Waldenstrom

(10) Patent Number: US RE41,647 E
(45) Date of Reissued Patent: Sep. 7, 2010

(54) METHOD OF MAKING A CEMENTED CARBIDE BODY WITH INCREASED WEAR RESISTANCE

(75) Inventor: Mats Waldenstrom, Bromma (SE)

(73) Assignee: Sandvik Intellectual Property Aktiebolag, Sandviken (SE)

(21) Appl. No.: 11/484,833

(22) Filed: Jul. 12, 2006

Related U.S. Patent Documents

Reissue of:
(64) Patent No.: 6,294,129
Issued: Sep. 25, 2001
Appl. No.: 09/482,083
Filed: Jan. 13, 2000

(30) Foreign Application Priority Data

Jan. 14, 1999 (SE) ..... 9900079

(51) Int. Cl.
*B22F 3/12* (2006.01)

(52) U.S. Cl. ..... 419/18; 419/35; 419/38
(58) Field of Classification Search ..... 419/18, 419/35, 38, 15
See application file for complete search history.

(56) References Cited

U.S. PATENT DOCUMENTS 5,505,902 A 4/1996 Fischer et al.
5,529,804 A 6/1996 Bonneau et al.
5,624,766 A 4/1997 Moriguchi et al.
5,902,942 A 5/1999 Maderud et al.
5,993,730 A 11/1999 Waldenström et al.
6,210,632 B1 * 4/2001 Ostlund et al. ..... 419/15
6,214,287 B1 4/2001 Waldenstrom
6,221,479 B1 4/2001 Waldenstrom et al.

FOREIGN PATENT DOCUMENTS

WO 98/03690 7/1997

* cited by examiner

*Primary Examiner*—Roy King
*Assistant Examiner*—Ngoclan T Mai
(74) *Attorney, Agent, or Firm*—Drinker Biddle & Reath LLP

(57) ABSTRACT

The present invention relates to a method of making a cemented carbide body with a bimodal grain size distribution by powder metallurgical methods including wet mixing, without milling, of WC-powders with different grain size distributions with binder metal and pressing agent, drying, pressing and sintering. The grains of the WC-powders are classified in at least two groups, a group of smaller grains and a group of larger grains. According to the method of the present invention, the grains of the group of smaller grains are precoated with a growth inhibitor with or without binder metal.

30 Claims, 1 Drawing Sheet

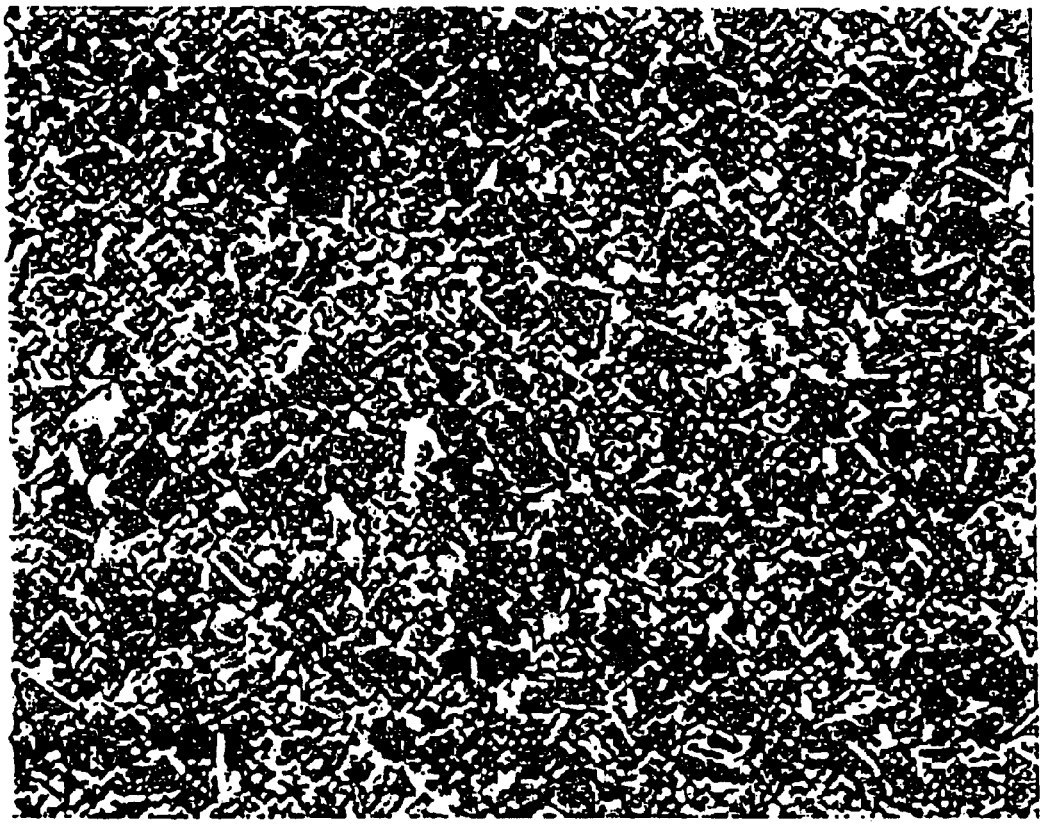
Fig. 1 X1000

METHOD OF MAKING A CEMENTED CARBIDE BODY WITH INCREASED WEAR RESISTANCE

Matter enclosed in heavy brackets [ ] appears in the original patent but forms no part of this reissue specification; matter printed in italics indicates the additions made by reissue.

*CROSS-REFERENCES TO RELATED APPLICATIONS*

*The present application is a reissue of U.S. Pat. No. 6,294,129 B1, filed on Jan. 13, 2000, which claims the benefit of priority to Swedish Application No. 9900079-6 filed Jan. 14, 1999.*

FIELD OF THE INVENTION

The present invention relates to cemented carbide bodies particularly useful in tools for turning, milling and drilling in steels and stainless steels.

BACKGROUND OF THE INVENTION

The following description contains references to certain compositions, articles, and methods. These references should not necessarily be construed as an admission that such compositions, articles and methods qualify as prior art under the applicable statutory provisions. Applicants reserve the right to demonstrate that the below-described subject matter does not qualify as "prior art" against the claimed invention.

Cemented carbide bodies are manufactured according to powder metallurgical methods including milling, pressing and sintering. The milling operation is an intensive mechanical milling in mills of different sizes and with the aid of milling bodies. The milling time is of the order of several hours up to days. Such processing is believed to be necessary in order to obtain a uniform distribution of the binder phase in the milled mixture, but it results in a wide WC grain size distribution.

In U.S. Pat. Nos. 5,505,902 and 5,529,804 methods of making cemented carbide are disclosed according to which the milling is essentially excluded. Instead, in order to obtain a uniform distribution of the binder phase in the powder mixture the hard constituent grains are precoated with the binder phase, the mixture is further wet mixed with pressing agent dried, pressed and sintered. In the first mentioned patent the coating is made by a SOL-GEL method and in the second a polyol is used.

Swedish patent application 9703738-6 discloses a method of producing submicron metal composite materials such as cemented carbide. Instead of precoating the WC grains with binder phase, the WC grains are precoated with elements inhibiting grain growth, such as Cr and V.

U.S. Pat. No. 5,624,766 discloses a coated cemented carbide insert with a bimodal distribution of WC grain size, with WC grains in two groups: 0.1–1 μm and 3–10 μm. The insert according to this patent is produced with conventional milling and sintering techniques resulting in an inevitable broadening of the WC grain size distribution during milling and grain growth during sintering.

WO 98/03690 discloses a coated cemented carbide insert with a bimodal distribution of WC grain size, with WC grains in two groups: 0–1.5 μm and 2.56–6.0 μm. Although there is no milling, a certain amount of grain growth takes place in the sintering step.

SUMMARY OF THE INVENTION

According to the present invention a method of making a cemented carbide body with a bimodal grain size distribution comprises the steps of:

(i) wet mixing, without milling, WC-powders with a binder metal and a pressing agent the WC powders comprising smaller grains precoated with a grain growth inhibitor and larger grains;

(ii) drying the mixture of step (i);

(iii) pressing the dried mixture to form a pressed body; and (iv) sintering the pressed body.

BRIEF DESCRIPTION OF THE DRAWING FIGURE

FIG. 1 shows in 1000× magnification of the cemented carbide microstructure according to the present invention.

DETAILED DESCRIPTION OF THE INVENTION

It has now surprisingly been found that improvement of the properties of a cemented carbide according to U.S. Pat. No. 5,624,766 and WO 98/03690 can be obtained if such a material is made using the coating technique disclosed in above mentioned Swedish patent application 9703738-6. Groups of smaller WC grains are precoated with grain growth inhibitors, with or without binder phase, and mixed with coarser hard constituent fractions which can be coated with binder phase according to any of the previously mentioned US patents. It is essential, according to the invention, that there should be no change in grain size or grain size distribution as a result of the mixing procedure or as a result of the grain growth in the sintering step. As a result a structure characterized of an extremely low grain growth is obtained.

According to the method of the present invention, a cemented carbide body with a bimodal grain size distribution is made by powder metallurgical methods including wet mixing, without milling, of WC-powders with different grain size distributions with binder metal and pressing agent, drying, preferably by spray drying, pressing and sintering.

In preferred embodiments, the grains of the WC-powders are classified in at least two groups in which a group of smaller gains has a maximum grain size $a_{max}$ and a group of larger grains has a minimum grain size $b_{min}$ wherein $b_{min}-a_{max}>0.5$ μm. It is further preferred that the variation in grain size within each group is at least 1 μm, and that each group contains at least 10% of the total amount of WC grains.

According to the method of the present invention the grains of the group of smaller grains are precoated with a grain growth inhibitor. Preferably the grain growth inhibitor includes V and/or Cr, and the grains of the group of larger grains are precoated with binder metal. The composition of the body comprises WC and 4–20 wt-% Co, preferably 5–12.5 wt-% Co and <30 wt-%, preferably <15 wt-% cubic carbide such as TiC, TaC, NbC or mixtures or solid solutions thereof, including WC. The WC grains are classified in two groups with a weight ratio of fine WC grains to coarse WC grains in the range of 0.25–4.0, preferably 0.5–2-0. Preferably the two groups include the grain size ranges 0–1.5 μm (fine grains) and 2.5–6.0 μm (coarse grains).

In a one embodiment, the body is a cutting tool insert provided with a thin wear resistant coating. Preferably the coating comprises $TiC_xN_yO_z$ with columnar grains followed by a layer of $\alpha$-$Al_2O_3$, $\kappa$-$Al_2O_3$ or a mixture of $\alpha$- and $\kappa$-$Al_2O_3$.

In a further embodiment, the W-content in the binder phase expressed as the "CW-ratio" is 0.82–1.0, preferably 0.86–0.96 where the CW-ratio is defined as $$\text{CW-ratio}=M_s/(\text{wt-\% Co}*0.0161)$$

where $M_s$ is the measured saturation magnetization of the sintered insert in [κA/m] $hAm^2/kg$ and wt-% Co is the weight percentage of Co in the cemented carbide.

EXAMPLE 1

A cemented carbide body with the composition, in addition to WC, of 10 wt-% Co, and 0.3 wt-% $Cr_3C_2$ were produced according to the invention. Cobalt-coated WC with an average grain size of 4.2 μm, WC-3 wt-% Co, prepared in accordance with U.S. Pat. No. 5,505,902 and chromium coated WC with an average grain size of 0.8 μm, WC-0.43 wt-% Cr, prepared in accordance with 970378-6 was carefully deagglomerated in a laboratory jetmill equipment, and mixed with additional amounts of Co to obtain the desired material composition. The coated WC-particles consisted of 40 wt-% of the particles with the average grain size of 4.2 μm and 60 wt-% of the particles with the average grain size of 0.8 μm, giving a bimodal grain size distribution. The mixing was carried out in an ethanol and water solution (0.25 liter fluid per kg of cemented carbide powder) for 2 hours in a laboratory mixer and the batch size was 10 kg. Furthermore, 2 weight-% lubricant was added to the slurry. The carbon content was adjusted with carbon black to render a binder phase alloyed with W corresponding to a CW-ratio of 0.89. After spray drying, the inserts were pressed and sintered according to standard practice and a dense bimodal structure with no porosity having an extremely low amount of grain growth was obtained.

FIG. 1 shows in 1000× magnification the cemented carbide microstructure formed according to this example.

EXAMPLE 2

A cemented carbide body with the composition, in addition to WC, of 10 wt-% Co, and 0.3 wt-%-$Cr_3C_2$ were produced according to the invention. Cobalt-coated WC with an average grain size of 4.2 μm, WC-3 wt-% Co, prepared in accordance with U.S. Pat. No. 5,505,902 and chromium-cobalt coated WC with an average grain size of 0.8 μAm, WC-0.43 wt-% Cr-2 wt-% Co, prepared in accordance with 9703738-6 was carefully deagglomerated in a laboratory jetmill equipment, and mixed with additional amounts of Co to obtain the desired material composition. The coated WC-particles consisted of 40 wt-% of the particles with the average grain size of 4.2 μm and 60 wt-% of the particles with the average grain size of 0.8 μm, giving a bimodal grain size distribution. The mixing was carried out in an ethanol and water solution (0.25 liter fluid per kg cemented carbide powder) for 2 hours in a laboratory mixer and the batch size was 10 kg. Furthermore, 2 weight-% lubricant was added to the slurry. The carbon content was adjusted with carbon black to a binder phase alloyed with W corresponding to a CW-ratio of 0.89. After spray drying, the inserts were pressed and sintered according to standard practice and a dense bimodal structure identical to Example 1 and with no porosity and having an extremely low amount of grain growth was obtained.

EXAMPLE 3

A cemented carbide body with the composition, in addition to WC, of 10 wt-% Co, 0.2 wt-% VC were produced according to the invention. Cobalt-coated WC with an average grain size of 4.2 μm, WC-3 wt-% Co, prepared in accordance with U.S. Pat. No. 5,505,902 and vanadium coated WC with an average grain size of 0.8 μm, WC-0.28 wt-% V, prepared in accordance with 9703738-6 was carefully deagglomerated in a laboratory jetmill equipment, and mixed with additional amounts of Co to obtain the desired material composition. The coated WC-particles consisted of 40.0 wt-% of the particles with the average grain size of 4.2 μm and 60 wt-% of the particles with the average grain size of 0.8 μm, giving a bimodal grain size distribution. The mixing was carried out in an ethanol and water solution (0.25 liter fluid per kg cemented carbide powder) for 2 hours in a laboratory mixer and the batch size was 10 kg. Furthermore, 2 weight-% lubricant was added to the slurry. The carbon content was adjusted with carbon black to a binder phase alloyed with W corresponding to a CW-ratio of 0.89. After spray drying, the inserts were pressed and sintered according to standard practice and a dense bimodal structure identical to Example 1 and with no porosity having an extremely low amount of grain growth was obtained.

What is claimed is:

1. A method of making a cemented carbide body with a bimodal grain size distribution comprising the steps of:

(i) wet mixing, without milling, WC-powders with a binder metal and a pressing agent, the WC powders comprising smaller grains precoated with a grain growth inhibitor, and larger grains;

(ii) drying the mixture of step (i);

(iii) pressing the dried mixture to form a pressed body; and (iv) sintering the pressed body.

2. The method of claim 1, wherein the smaller grains have a maximum size $a_{max}$, and the larger grains have a minimum size $b_{min}$ and wherein $b_{min}$-$a_{max}$>0.5 μm.

3. The method of claim 2, wherein the variation in grain size within each group of smaller and larger grains is at least 1 μm.

4. The method of claim 1, wherein the smaller grains comprise at least 10% of the total amount of WC grains, and the larger grains comprise at least 10% of the total amount of WC grains.

5. The method of claim 1, wherein the grain growth inhibitor is at least one of V and Cr.

6. The method according to claim 1, wherein the group of larger grains are precoated with binder metal.

7. The method according to claim 1, wherein the composition of the mixture of step (i) comprises WC and 4–20 wt-% Co and <30 wt-%, cubic carbide comprising TiC, TaC, NbC or mixtures or solid solutions thereof including WC.

8. The method according to claim 1, wherein in the WC grains being classified in two groups with a weight ratio of fine WC grains having a size of 0–1.5 μm to coarse WC particles having a size of 2.5–6.0 μm is in the range of 0.25–4.0.

9. The method according to claim 6, wherein the smaller grain size ranges from 0–1.5 μm and the larger grain size ranges from 2.5–6.0 μm.

10. The method according to claim 1, wherein the body is a cutting tool insert.

11. The method according to claim 10 wherein the insert body is provided with a thin wear resistant coating.

12. The method according to claim 11 wherein the coating comprises [$TiC_xN_yO_z$] $TiC_xN_yO_z$ with columnar grains followed by a layer of α-$Al_2O_3$, κ-$Al_2O_3$ or a mixture of α- and κ-$Al_2O_3$.

13. The method according to claim 1, wherein the W-content in the Co binder phase expressed as the "CW-ratio" defined as $$CW\text{-}ratio = M_s/(wt\text{-}\%\ Co*0.0161)$$

where $M_s$ is the measured saturation magnetization of the sintered body in [κA/m] *hAm²/kg* and wt-% Co is the weight percentage of Co in the cemented carbide is 0.82–1.0.

14. The method of claim 1, wherein step (ii) includes spray drying.

15. The method of claim 1, wherein the precoating of the smaller grains of step (i) comprises binder metal.

16. The method of claim 7, wherein the composition of the mixture of step (i) comprises WC and 5–12.5 wt. % Co and <15 wt. % of the cubic carbides.

17. The method of claim 8, wherein the weight ratio is in the range of 0.5–2.0.

18. The method of claim 1, wherein only the smaller grains are precoated with the grain growth inhibitor.

19. A method of making a cemented carbide body comprising the steps of:

(i) providing a WC powder, the WC powder comprises a group of fine WC grains and a group of [course] *coarse* WC grains;

(ii) precoating the fine WC grains with a grain growth inhibitor;

(iii) precoating the [course] *coarse* WC grains with a binder metal;

(iv) wet mixing, without milling, the precoated fine WC grains, the precoated [course] *coarse* WC grains, additional binder metal and a pressing agent;

(v) drying the mixture of step (iv);

(vi) pressing the dried mixture to form a pressed body; and (vii) sintering the pressed body.

20. The method of claim 19, wherein steps (iv) and (vii) are performed such that no change in grain size or grain size distribution are produced.

21. The method of claim 19, wherein the binder metal comprises Co.

22. The method of claim 19, wherein the fine WC grains have a maximum size $a_{max}$, the coarse WC grains have a minimum size $b_{min}$, and [$b_{min}$-$a_{max}$<0.5 μm] $b_{min}$-$a_{max}$>0.5 μm.

23. The method of claim 19, wherein the fine grains comprise at least 10% of the total amount of WC grains, and the course grains comprise at least 10% of the total amount of WC grains.

24. The method of claim 19, wherein the grain growth inhibitor comprises at least one of V and Cr.

25. The method of claim 19, wherein the fine grains have a size of 0–1.5 μm and the coarse grains have a size of 2.5–6.0 μm.

26. The method of claim 25, wherein a weight ratio of fine WC grains to coarse WC grains is 0.25–4.0.

27. The method of claim 26, wherein the ratio is 0.5–2.0.

*28. The method of claim 19, wherein the cemented carbide body has a CW-ratio of 0.82–1.0.*

*29. The method of claim 28, wherein the CW-ratio is 0.86–0.96.*

*30. The method of claim 13, wherein the CW-ratio is 0.86–0.96.*

* * * * *